US008161546B2

(12) United States Patent  (10) Patent No.: US 8,161,546 B2
Parkinson et al.  (45) Date of Patent: Apr. 17, 2012

(54) PARTITIONING DATA ON A SMARTCARD DEPENDENT ON ENTERED PASSWORD

(75) Inventors: Steven W. Parkinson, San Jose, CA (US); Robert Lord, San Jose, CA (US)

(73) Assignee: Red Hat, Inc., Raleigh, NC (US)

( * ) Notice: Subject to any disclaimer, the term of this patent is extended or adjusted under 35 U.S.C. 154(b) by 1083 days.

(21) Appl. No.: 11/712,634

(22) Filed: Feb. 28, 2007

(65) Prior Publication Data

US 2008/0209574 A1  Aug. 28, 2008

(51) Int. Cl.
*G06F 21/00* (2006.01)

(52) U.S. Cl. ................. 726/20; 726/9; 713/173

(58) Field of Classification Search ............... 726/9, 20, 726/26–28; 713/173, 193, 194, 185
See application file for complete search history.

(56) References Cited

U.S. PATENT DOCUMENTS

| 5,544,246 | A  | * | 8/1996 | Mandelbaum et al. ......... 705/65 |
| 6,038,551 | A  | * | 3/2000 | Barlow et al. ................ 705/41 |
| 6,401,203 | B1 | * | 6/2002 | Eigeles ..................... 713/156 |
| 7,011,247 | B2 |   | 3/2006 | Drabczuk et al. |
| 7,096,494 | B1 | * | 8/2006 | Chen .......................... 726/9 |
| 7,140,549 | B2 |   | 11/2006 | de Jong |
| 2004/0088562 | A1 | * | 5/2004 | Vassilev et al. ............. 713/200 |
| 2005/0010796 | A1 | * | 1/2005 | Arnouse ..................... 713/200 |
| 2007/0027873 | A1 | * | 2/2007 | Factor et al. ................ 707/9 |

* cited by examiner

*Primary Examiner* — Edward Zee (74) *Attorney, Agent, or Firm* — Lowenstein Sandler PC (57) ABSTRACT

In one embodiment, an apparatus and method for partitioning data on a smartcard dependent on an entered password are disclosed. In one embodiment, the method includes maintaining multiple containers in a smartcard, associating a different personal identification number (PIN) with each of the multiple containers, and accessing contents of a container when an associated PIN for the container is provided by a user of the smartcard. Other embodiments are also described.

20 Claims, 7 Drawing Sheets

Identity Certificate 400

Attribute Certificate 420

PARTITIONING DATA ON A SMARTCARD DEPENDENT ON ENTERED PASSWORD

TECHNICAL FIELD

Embodiments of the present invention relate to smartcards and, more specifically, relate to partitioning data on a smartcard dependent on an entered password.

BACKGROUND

Most people now have a collection of small plastic cards, representing various credit cards, store cards, identity cards, membership cards, etc. Information about the card and its owner (e.g., account details) is normally printed or embossed on the card, and may also be stored in some form of magnetic strip. In recent years, smartcards have also proliferated. Smartcards are standardized portable articles defined in ISO standard 7816. Smartcards are typically used to provide secure management of confidential data and to provide authentication.

A smartcard incorporates within its plastic case a microelectronic memory and also an embedded processor. The memory is used to store various data including, for example, private keys, identity certificates, email certificates, etc. A single personal identification number (PIN) is used to access the data stored on the smartcard.

A smartcard may also host software that manipulates the stored data. The software may be in the form of a Java applet, and a Java virtual machine (VM) may be provided within the smartcard to allow the execution of Java applets. A Java applet typically creates a container to hold required data and ensures that the container is only accessed by an authorized user. In particular, an applet may store a PIN associated with the container and allow a user to access the contents of the container only if the user provides a correct PIN.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for partitioning data on a smartcard dependent on an entered password. In one embodiment, the method includes maintaining multiple containers in a smartcard, associating a different personal identification number (PIN) with each of the multiple containers, and accessing contents of a specific container when a PIN associated with this container is provided by a user of the smartcard.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-accessible storage medium includes any mechanism for storing or transmitting information in a form readable by a machine (e.g., a computer). For example, a machine-accessible storage medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Figure 1:
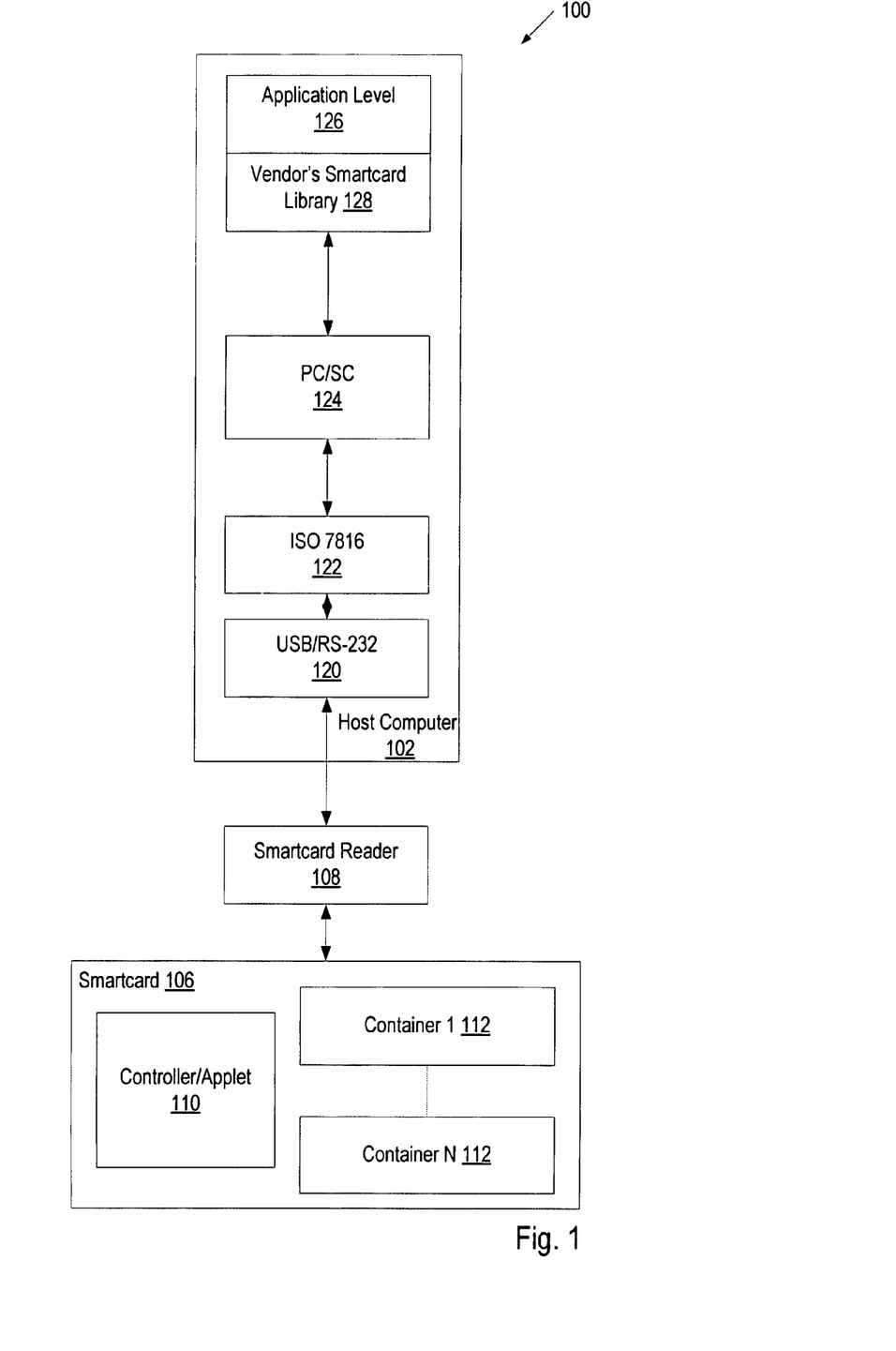
FIG. 1 illustrates a system architecture in which embodiments of the present invention may be implemented.

FIG. 1 illustrates an exemplary system architecture 100 in which embodiments of the present invention may operate. The system architecture 100 includes a host computer 102 and a smartcard 106. The host computer 102 may be a handheld device, a personal computer (PC), a dedicated card reader terminal (e.g., an ATM machine) or any other suitable system.

The smartcard 106 is a portable article that is defined in ISO standard 7816. The smartcard 102 interacts with the host computer 102 via a smartcard reader 108 that detects when the smartcard is in place (e.g., using a sensor). The smartcard reader 108 may be part of the host computer 102 or an independent device. When the smartcard 106 is inserted into the smartcard reader 108, two communication protocols are involved in supporting interactions between the smartcard 106 and the host computer 102. In particular, a protocol unit 122 complies with the ISO-7816 protocol that provides detailed requirements for the interface between the smartcard 106 and the smartcard reader 108, and defines the format for application protocol data unit (APDU) commands exchanged between the smart card 106 and the host computer 102. A protocol unit 120 complies with the USB protocol or the serial RS-232 protocol that provides an interface for communications between the smartcard reader 108 and the host computer 102. The smartcard reader 108 contains electronic circuits and embedded software that enable communication with the smartcard 106 using the ISO-7816 protocol and the host computer using the USB or RS-232 protocol.

A PC/SC unit 124 is compliant with the personal computer/smartcard (PC/SC) standard that provides device-independent application programming interfaces (APIs) as well as resource management to allow applications 126 to communicate with the smartcard 106. The applications 126 utilize a smartcard library 128 provided by a smartcard vendor to supply data necessary for interactions with the smartcard 106.

Generally, when the smartcard 106 is inserted into the smartcard reader 108, the smartcard reader 108 activates the smartcard 106 (e.g., by providing power to the smartcard 106) and notifies an application 126 running on the host computer 102. The application 126 then prompts the user of the smartcard 106 for a password or personal identification number (PIN). In addition, the application 126 sends an ADPU message to the smartcard 106 with a request to verify the PIN provided by the user.

The smartcard 106 may include a microcontroller 110 with associated memories and software. The software may include one or more Java applets executing on a Java virtual machine (VM) provided within the smartcard 106. It should be noted that the term "Java applets" (or "applets") is used herein for illustrative purposes only; the software running on the smartcard 106 can include any program other than a Java applet. For example, a C or C++ program can run on the smartcard 106 to provide the functionality discussed herein.

An applet creates multiple containers 112 within the smartcard memory to hold various data (e.g., user private keys, identity certificates, email certificates, attribute certificates, etc.). Each container is associated with a different PIN. For example, if a user uses the smartcard 106 with his or her "work" identity, as well as "home" identity, container 1 may be associated with a first PIN representing the user's work identity, and container 2 may be associated with a second PIN representing the user's home identity. Container 1 may store a certificate and private key issued by the user's employer, and container 2 may store a certificate and private key issued by an external certificate authority (e.g. VeriSign®). Hence, the data stored on the smartcard 106 is partitioned dependent on the user identity or a password or PIN associated with the user identity.

When an applet receives a PIN provided by the user, the applet checks this PIN against each container 112. If the PIN provided by the user unlocks a particular container 112, the applet notifies the application 126 that the user has provided a correct PIN. The applet hides the existence of multiple containers associated with different PINs from the user by continuing to check the PIN against the containers 112 until finding a container having the PIN provided by the user. If no such container is found, the applet notifies the application 126 that the PIN provided by the user is incorrect. The application 126 then conveys this message to the user. In one embodiment, the application 126 is unaware of the existence of multiple containers and/or different PINs on the smartcard 106. Rather it is the applet that fully controls the access to the containers 112 and how the data is stored in the containers 112.

Figure 2:
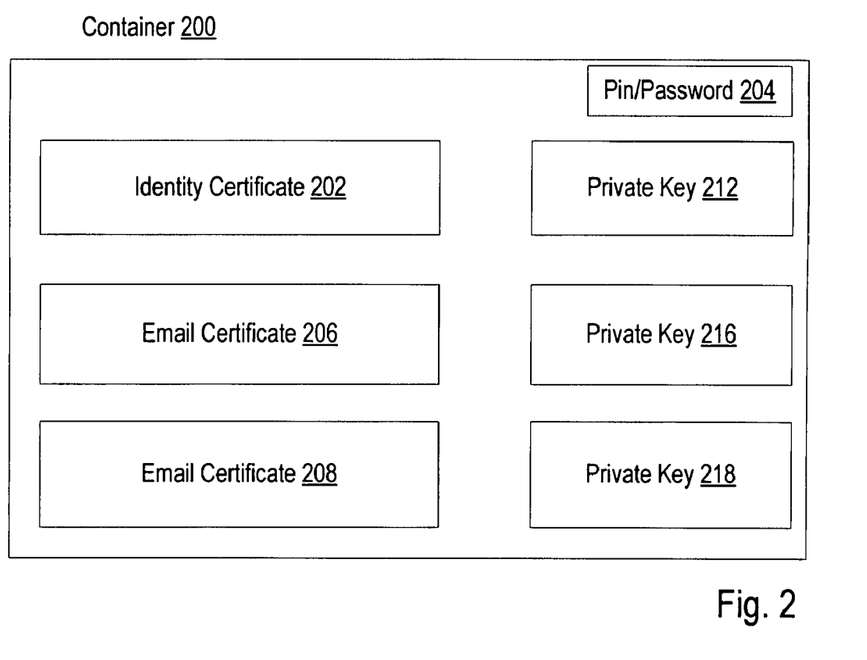
FIG. 2 is a block diagram illustrating contents of an exemplary container, according to one embodiment of the invention.

FIG. 2 is a block diagram illustrating contents of an exemplary container 200, according to one embodiment of the invention. The container 200 includes an identity certificate 202 and a corresponding private key 212. The identity certificate 202 uses a digital signature to bind together a public key with the user identity (e.g., user name). The container 202 may also include email certificates 206 and 208 with corresponding private keys 216 and 218. Email certificates 206 and 208 may be issued by two distinct email certificate authorities recognized by different email recipients and are used to provide secure email communications with these recipients.

The container 200 further includes a password or PIN 204 that is unique for the container 200. When the user enters a PIN, it is checked against the stored PIN 204. If the two PINs match, the user is allowed to access the contents of the container 200. If the two PINs do not match, the PIN provided by the user is compared against other containers on the smartcard.

Returning to FIG. 1, in one embodiment, the smartcard 106 includes multiple applets. For example, the smartcard 106 may include one applet to control digital data (e.g., digital certificate, private keys, etc.) and another applet to control biometric data (e.g., user fingerprints). The application 126 may use the vendor's smartcard library 128 to determine an identifier (ID) of an applet that should execute a requested task and include this applet ID in the ADPU message sent to the smartcard 106.

Figure 3:
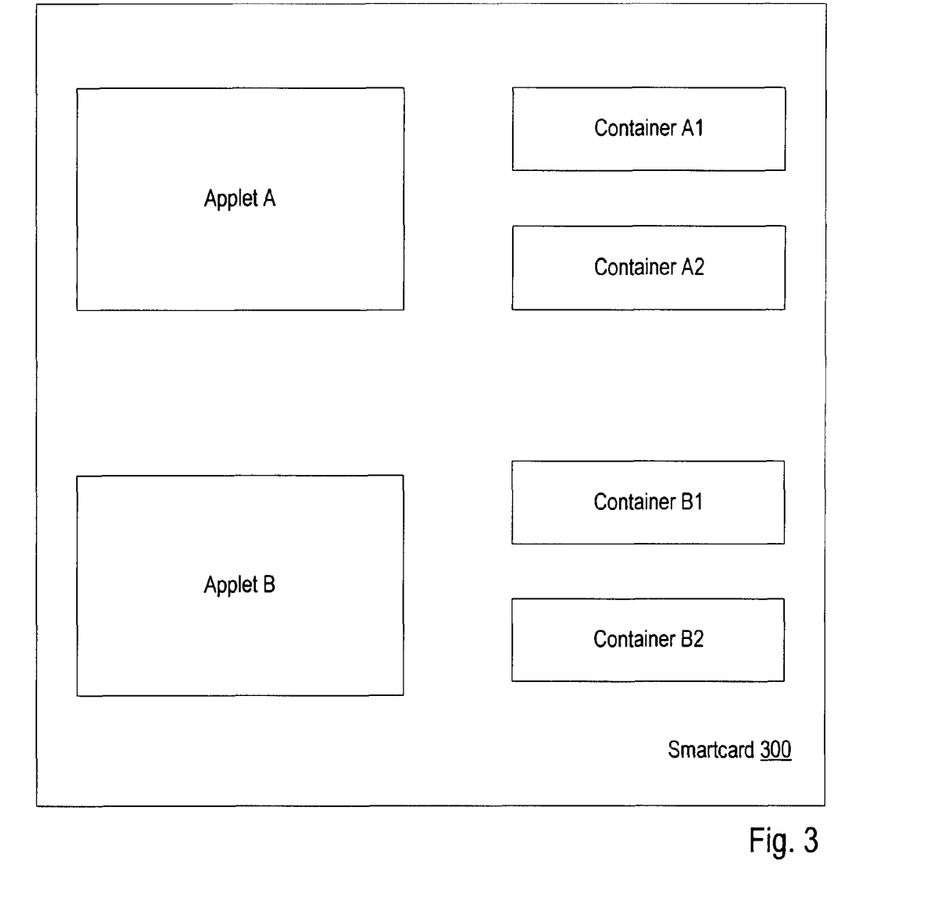
FIG. 3 is a block diagram of a smartcard having multiple applets, in accordance with one embodiment of the invention.

FIG. 3 is a block diagram of a smartcard 300 having multiple applets, in accordance with one embodiment of the invention. In particular, the smartcard 300 has applets A and B. Applet A maintains containers A1 and A2, and applet B maintains containers B1 and B2. Applet A may associate containers A1 and A2 with different PINs. Similarly, applet B may associate containers B1 and B2 with two distinct PINs. For example, applet A may be designated to control the user's identity certificates, with container A1 storing the identity certificate and corresponding private key for the user's work identity and container A2 storing the identity certificate and corresponding private key for the user's home identity. Applet B may be designated to control email certificates of the user, with container B1 storing the email certificate and corresponding private key for the user's work identity and container B2 storing the email certificate and corresponding private key for the user's home identity.

In another embodiment, applets A and B may maintain containers to store identity and attribute certificate respectively. For example, a host application 1 running on the host computer may need the user's identity certificate to allow his or her access to certain data, and a host application 2 may need the user's attribute certificate to allow his or her access to data associated with a specific project. Then, application 1 may interact with applet A to obtain the user identity certificate and application 2 may interact with applet B to obtain the user attribute certificate. Depending on the user's current identity, applets A and B may provide certificates from corresponding containers to applications 1 and 2.

Figure 4:
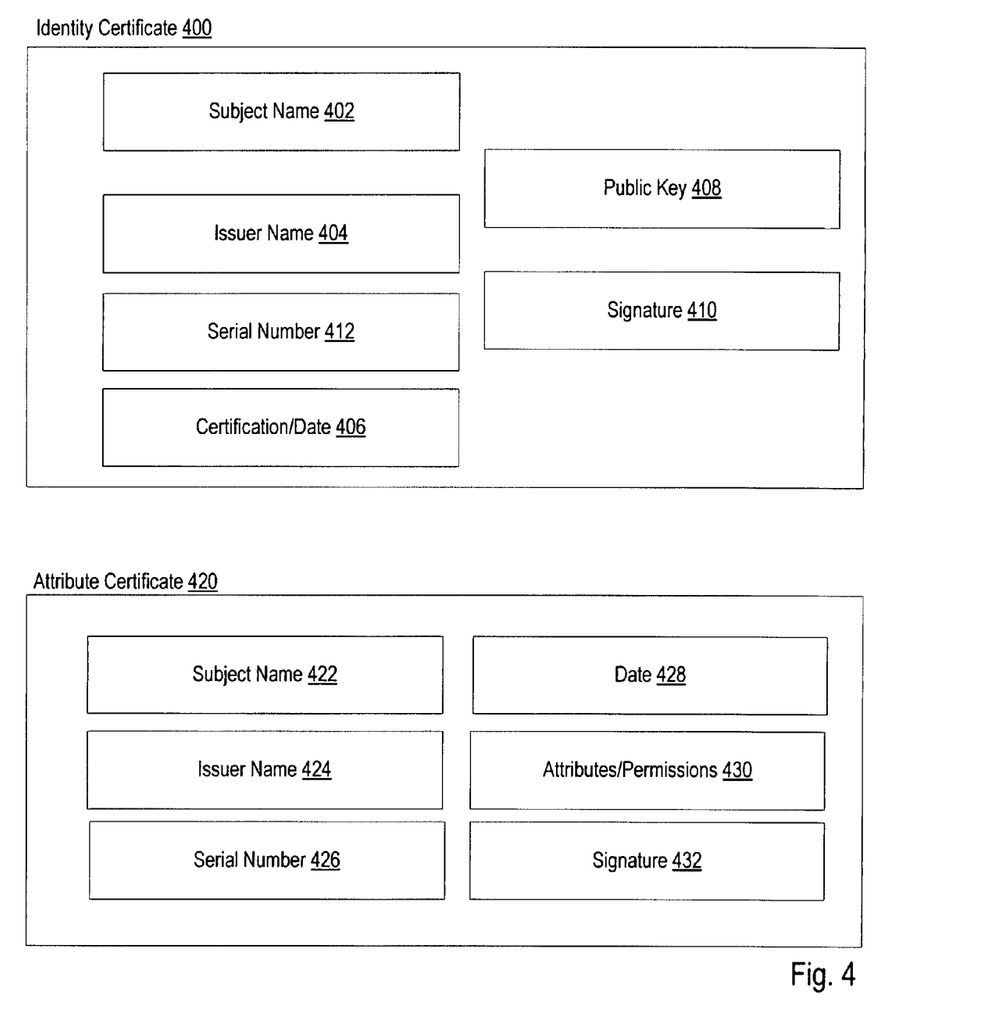
FIG. 4 illustrates exemplary identity and attribute certificates, in accordance with one embodiment of the invention.

FIG. 4 illustrates exemplary identity and attribute certificates, in accordance with one embodiment of the invention. An identity certificate 400 includes a certificate issuer name 404, a certificate serial number 412, a certification date 406, a subject name 402, an assigned public key 408, and a signature 410. The signature 410 binds the public key 408 with the subject name 402 (e.g., the user name). The identity certificate 400 has a corresponding private key (not shown) that may be stored in the same container as the identity certificate 400 and be protected with the same PIN.

The attribute certificate 420 includes a certificate issuer name 424, a certificate serial number 426, a certification date 428, a subject name 422, an attribute 430, and a signature 432. The signature 432 binds the subject name 422 (e.g., user name) with the attribute 430 which may concern a certain capability or permission. For example, the signature 432 may confirm that the user identified by the subject name 422 has a clearance or security level specified by the attribute 430.

In one embodiment, the identity certificate 400 is placed in container A protected by PIN A, and the attribute certificate 420 is placed in container B protected by PIN B, thus separating private data from public data. When the user provides a PIN, the applet first compares this PIN against container A. If the PIN provided by the user matches PIN A, the application on the host computer can request the identity certificate 400 to prove the user's identity. Once the user is authenticated, the user may want to access data associated with a specific project. To be able to do that, the user will have to enter a different PIN (e.g., a user may be prompted to enter a new PIN) which will be compared against container B holding the attribute certificate 420. If the PIN provided by the user matches PIN B, the application on the host computer can request the attribute certificate 420 to determine whether the user's level of security allows the user to access this data. One embodiment of this mechanism will be discussed in more detail below in conjunction with FIG. 6.

Figure 5:
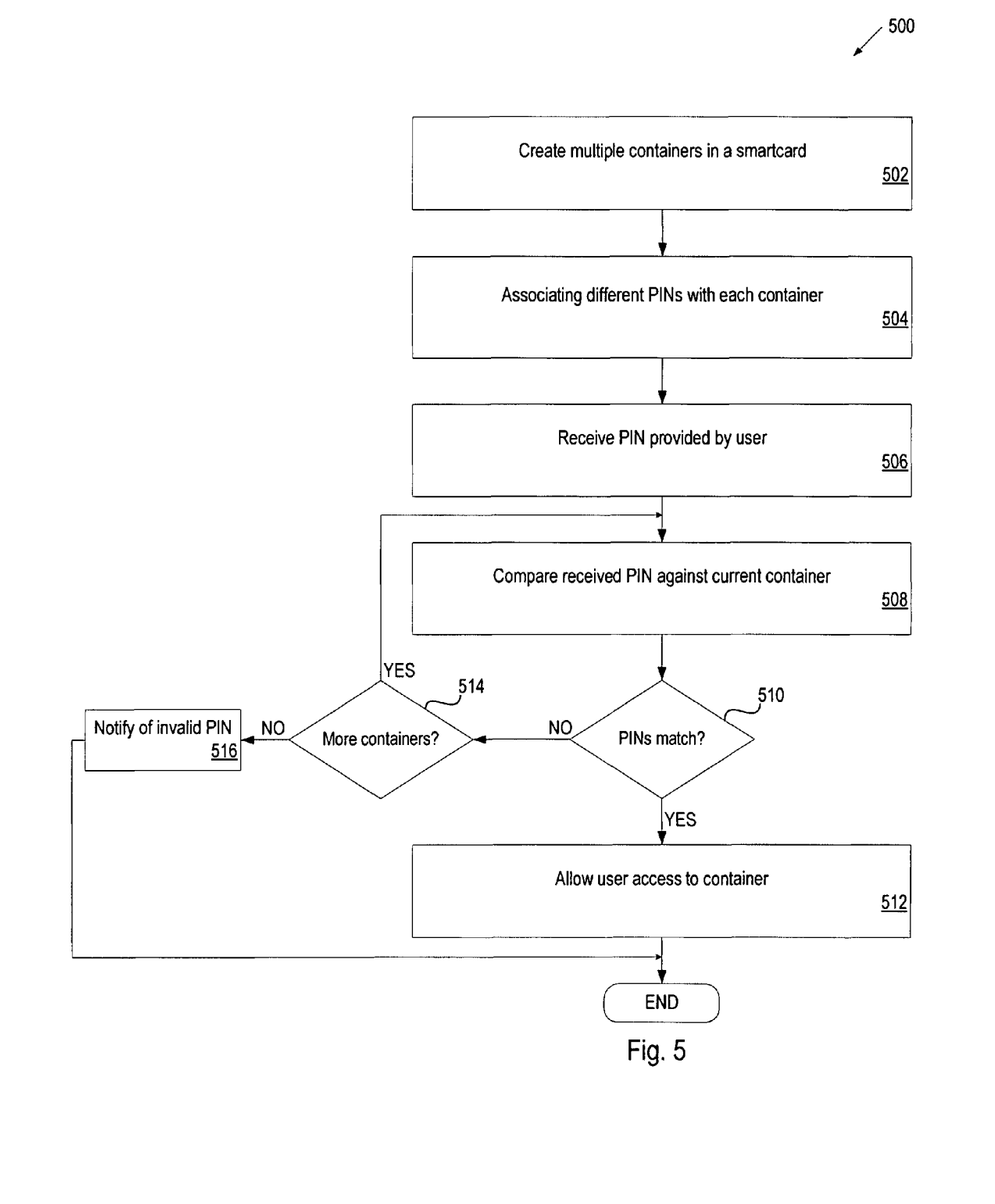
FIG. 5 is a flow diagram of one embodiment of a method for partitioning data on a smartcard.

FIG. 5 is a flow diagram of one embodiment of a method 500 for partitioning data on a smartcard. The method may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method is performed by a smartcard 106 (e.g., a controller or an applet) of FIG. 1.

Referring to FIG. 5, method 500 begins with processing logic creating multiple containers on the smartcard (block 502). At block 504, processing logic associates each container with a distinct PIN. Processing logic may store each PIN in a corresponding container or in a separate table or other store on the smartcard.

At block 506, processing logic receives a PIN provided by a user of the smartcard. At block 508, processing logic compares the received PIN with a PIN associated with a current container. If the two PINs match (block 510), processing logic allows user access to the container with the matching PIN (block 512).

If the two PINs do not match, processing logic determines whether all containers in the smartcard have been already checked (block 514). If so, processing logic notifies the host computer that the PIN provided by the user is invalid (block 516). If not, processing logic moves to the next container and returns to block 408.

Accordingly, method 500 hides the existence of multiple containers associated with different PINs from the host computer and the user.

Figure 6:
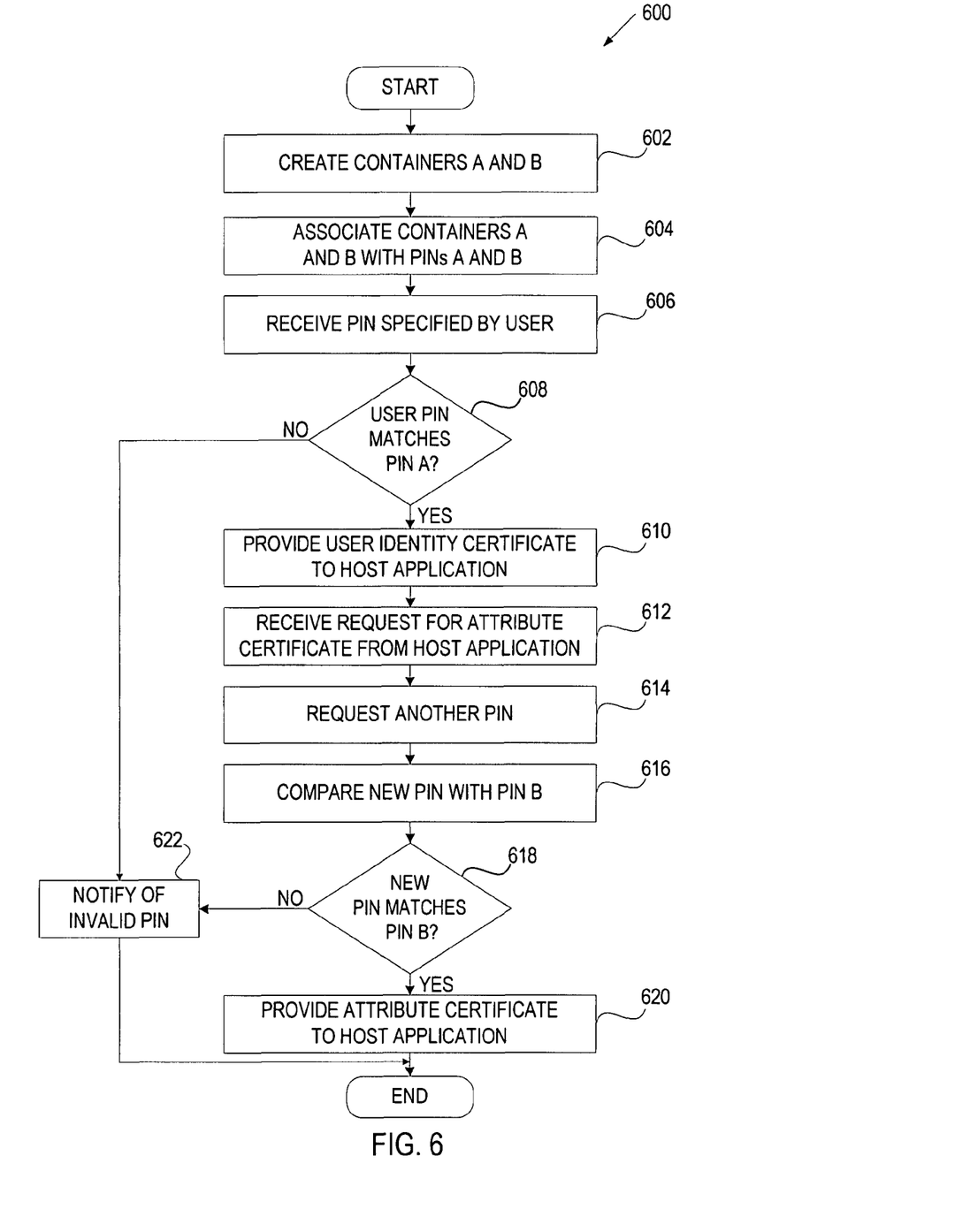
FIG. 6 is a flow diagram of another embodiment of a method for partitioning data on a smartcard.

FIG. 6 is a flow diagram of another embodiment of a method 600 for partitioning data on a smartcard. The method may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method is performed by a smartcard 106 (e.g., a controller or an applet) of FIG. 1.

Referring to FIG. 6, method 600 begins with processing logic creating containers A and B on the smartcard, placing the user identity certificate (with a corresponding private key) in container A, and placing the user attribute certificate in container B (block 602). At block 604, processing logic associates container A with PIN A and container B with PIN B. Processing logic may store each PIN in a corresponding container or in a separate table or other store on the smartcard.

At block 606, processing logic receives a PIN provided by a user of the smartcard. At block 608, processing logic compares the received PIN with PIN A associated with container A. If the two PINs match, processing logic provides the user identity certificate and/or corresponding private key to the host application (block 612). If not, processing logic notifies the host application that the PIN provided by the user is incorrect (block 622).

At block 612, processing logic receives a request for the user attribute certificate from the host application. At block 614, processing logic requests that the user be asked for another PIN. In one embodiment, processing logic uses a time-out mechanism to make the above request.

At block 616, processing logic compares the new PIN entered by the user with PIN B associated with container B. If the two PINs match, processing logic provides the attribute certificate to the host application (block 620). If not, processing logic notifies the host application that the PIN provided by the user is incorrect (block 622).

Figure 7:
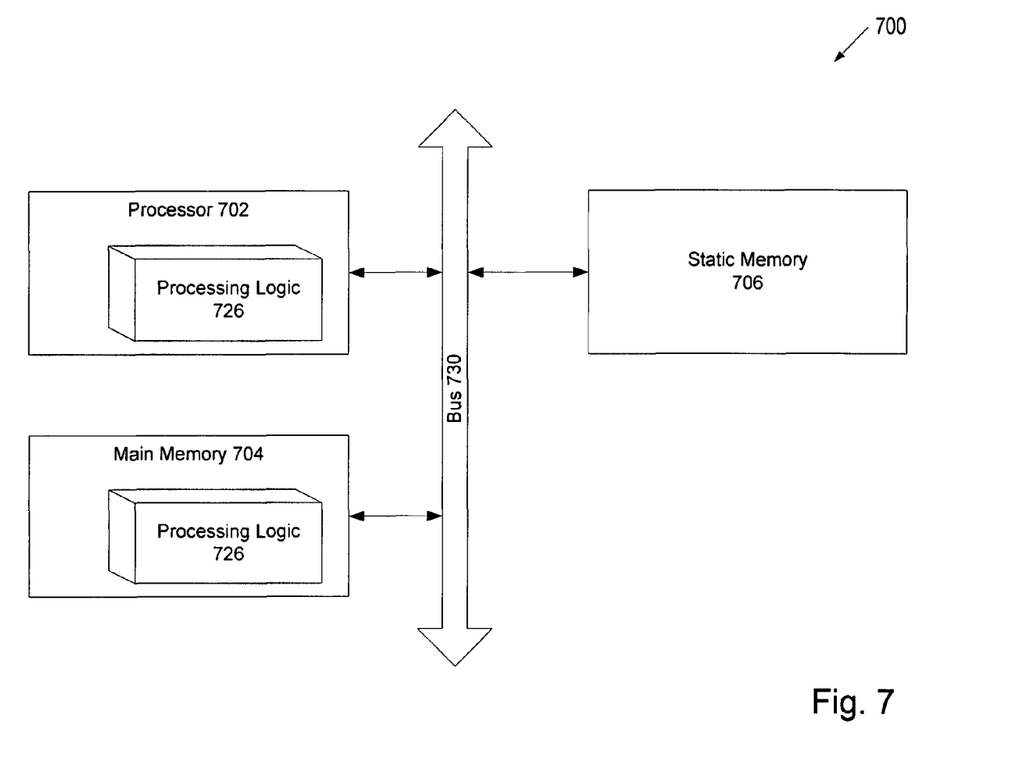
FIG. 7 illustrates an exemplary machine.

FIG. 7 illustrates a diagrammatic representation of a machine in the exemplary form of a system 700 within which a set of instructions, for causing the device to perform any one or more of the methodologies discussed herein, may be executed. The machine may represent a smartcard, a personal computer, a mobile device, or any other device. The exemplary system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), and a static memory 706 (e.g., flash memory, static random access memory (SRAM), etc.), which may communicate with each other via a bus 730. Alternatively, the processing device 702 may be connected to memory 704 and/or 706 directly or via some other connectivity means.

Processing device 702 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 702 is configured to execute processing logic 726 for performing the operations and steps discussed herein. The software 726 may also reside, completely or at least partially, within the main memory 704 and/or within the processing device 702 during execution thereof by the system 700, the main memory 704 and the processing device 702 also constituting machine-accessible storage media.

While the machine-accessible storage medium 826 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, comprising:
    managing, in a smartcard, multiple containers at each of a plurality of modules on the smartcard;
    associating a different personal identification number (PIN) with each of the multiple containers of each of the modules of the plurality of modules;
    receiving a PIN and an identifier of a module of the plurality of modules from a computer coupled with the smartcard, the PIN being provided by a user and the identifier of the module provided by the computer; and
    comparing, by the identified module, the PIN provided by the user against PINs associated with the multiple containers of the identified module;
    when the PIN provided by the user matches the PIN associated with a container of the multiple containers of the identified module, allowing access rights to contents of the container having the matching PIN.

2. The method of claim 1, wherein each container of the multiple containers of each of the modules of the plurality of modules stores information associated with a different identity of the user.

3. The method of claim 2, wherein the different identities includes at least one of a home user identity and a work user identity.

4. The method of claim 1, wherein a first container of the multiple containers of each of the modules of the plurality of modules includes an identification certificate and its associated private key, while a second container of the multiple containers of each of the modules of the plurality of modules includes an attribute certificate associated with the identification certificate.

5. The method of claim 4, wherein the first and second containers are accessed by different PINs.

6. The method of claim 1, wherein the allowing access further includes hiding an existence of the multiple containers of each of the modules of the plurality of modules from the user.

7. The method of claim 1, wherein a program executing on the smartcard is an applet that performs a matching algorithm to determine whether the PIN provided by the user can access a container of the multiple containers of each of the modules of the plurality of modules.

8. The method of claim 7, wherein the smartcard includes more than one applet, each applet associated with a different functionality of the smartcard.

9. An apparatus for a smartcard, comprising:
    a memory included in the smartcard;
    a processing device communicably coupled to the memory; and
    a plurality of applets executable from the memory by the processing device, each applet configured to:
    manage a plurality of containers that are stored in the memory, each container of the plurality of containers having a different personal identification number (PIN) associated with the container that is used to access content of the container;
    receive a PIN and an identifier of the applet, the PIN provided by a user from a computer coupled with the smartcard and the identifier of the applet provided by the computer;
    determine whether the PIN provided by the user matches any of the different PINs of the plurality of containers of the identified applet; and
    when the PIN provided by the user matches the PIN associated with a container of the plurality of containers of the identified applet, allow access to the contents of the container having the matching PIN.

10. The apparatus of claim 9, wherein each container of the plurality of containers stores information associated with a different identity of the user.

11. The apparatus of claim 10, wherein the different identities includes at least one of a home user identity and a work user identity.

12. The apparatus of claim 9, wherein a container of the plurality of containers includes an identification certificate and its associated private key, while another container of the plurality of containers includes an attribute certificate associated with the identification certificate.

13. The apparatus of claim 9, wherein each applet is further configured to hide an existence of the plurality of containers from the user.

14. The apparatus of claim 9, wherein each applet performs a matching algorithm to determine whether the PIN provided by the user can access a container of the plurality of containers.

15. The apparatus of claim 14, wherein each applet of the plurality of applets is associated with a different functionality of the smartcard.

16. A non-transitory machine-readable storage medium including data that, when accessed by a machine, cause the machine to perform operations comprising:
    managing, in a smartcard, multiple containers at each of a plurality of modules on the smartcard;
    associating a different personal identification number (PIN) with each of the multiple containers of each of the modules of the plurality of modules;
    receiving a PIN and an identifier of a module of the plurality of modules from a computer coupled with the smartcard, the PIN being provided by a user and the identifier of the module provided by the computer; and comparing, by the identified module, the PIN provided by the user against PINs associated with the multiple containers of the identified module;

when the PIN provided by the user matches the PIN associated with a container of the multiple containers of the identified module, allowing access rights to contents of the container having the matching PIN.

17. The non-transitory machine-readable storage medium of claim 16, wherein each container of the multiple containers of each of the modules of the plurality of modules stores information associated with a different identity of the user.

18. The non-transitory machine-readable storage medium of claim 16, wherein a container of the multiple containers of each of the modules of the plurality of modules includes an identification certificate and its associated private key, while another container of the multiple containers of each of the modules of the plurality of modules includes an attribute certificate associated with the identification certificate.

19. The non-transitory machine-readable storage medium of claim 16, wherein the allowing access further includes hiding an existence of the multiple containers of each of the modules of the plurality of modules from the user.

20. The non-transitory machine-readable storage medium of claim 16, wherein a program executing on the smartcard is an applet that performs a matching algorithm to determine whether the PIN provided by the user can access a container of the multiple containers of each of the modules of the plurality of modules.

* * * * *